(12) United States Patent  
Fernandez (10) Patent No.: US 8,082,887 B2  
(45) Date of Patent: Dec. 27, 2011

(54) GROOMING DEVICE

(75) Inventor: Juan Fernandez, Towaco, NJ (US)

(73) Assignee: Products of Tomorrow, Inc., Towaco, NJ (US)

( * ) Notice: Subject to any disclaimer, the term of this patent is extended or adjusted under 35 U.S.C. 154(b) by 0 days.

(21) Appl. No.: 12/590,976

(22) Filed: Nov. 17, 2009

(65) Prior Publication Data

US 2010/0122663 A1    May 20, 2010

Related U.S. Application Data

(60) Provisional application No. 61/277,946, filed on Oct. 1, 2009.

(30) Foreign Application Priority Data

Feb. 9, 2009 (CN) .......................... 2009 2 0007306

(51) Int. Cl.  
*A01K 13/00* (2006.01)

(52) U.S. Cl. .......................... 119/612; 119/629; 119/664

(58) Field of Classification Search .................. 119/611, 119/612, 613, 614, 615, 628, 629, 625, 664; 15/169, 246, 184, 185, 160, 186; 132/119, 132/120

See application file for complete search history.

(56) References Cited

U.S. PATENT DOCUMENTS

| | | | |
|---|---|---|---|
| 2,027,884 A * | 1/1936 | Schwab | 15/186 |
| 4,023,230 A | 5/1977 | Friedman | |
| 4,574,416 A | 3/1986 | Stewart | |
| 4,860,692 A | 8/1989 | Beard | |
| 4,977,909 A | 12/1990 | Chou | |
| 4,987,633 A | 1/1991 | Heneveld | |
| 4,988,228 A | 1/1991 | Yeh | |
| 5,133,103 A | 7/1992 | Nagasawa | |
| 5,267,528 A | 12/1993 | Murieen, Sr. | |
| 5,519,912 A | 5/1996 | Kawamura | |
| 5,600,865 A | 2/1997 | Morrison | |
| 5,815,877 A | 10/1998 | Heneveld | |
| 5,862,563 A | 1/1999 | Hartmann | |
| 5,904,150 A | 5/1999 | Caristo | |
| 6,021,542 A | 2/2000 | Norman | |
| 6,112,362 A | 9/2000 | Parko | |
| 6,421,872 B1 | 7/2002 | Sciandivsci | |
| 6,427,633 B1 | 8/2002 | Ogden | |
| 6,595,219 B2 | 7/2003 | Anderson | |
| 6,681,775 B2 | 1/2004 | Wang | |
| 6,718,913 B1 | 4/2004 | Stupar | |

(Continued)

*Primary Examiner* — T. Nguyen  
(74) *Attorney, Agent, or Firm* — Gearhart Law, LLC (57) ABSTRACT

The invention is an apparatus for grooming an animal having a brush head, the brush head having a plurality of bristles, each bristle having a midpoint and an endpoint, where the bristles are in general perpendicular orientation to the brush head, a cleaning plate, in general parallel orientation to the brush head, the cleaning plate able to move from a contracted to an extended position, the cleaning plate further having material removed to allow the bristles to protrude through the cleaning plate when it is in the retracted position; and a mechanism for extending and contracting the cleaning plate, wherein the cleaning plate has a bottom surface and the bottom surface does not extend past the bristle endpoint when the cleaning plate is in the extended position. In one embodiment, at least some bristles are wire, and in further embodiments the wire bristles have round coated tips. The brush head may further have a water outlet and a hose coupling for intake and dispensing of liquids. Furthermore, the present invention may have means for conducting water through the handle and out the water outlet, which may be a plurality of hollow bristles.

3 Claims, 8 Drawing Sheets

U.S. PATENT DOCUMENTS

| | | | |
|---|---|---|---|
| 7,225,758 B1 * | 6/2007 | Galloway | 119/603 |
| 7,225,815 B2 | 6/2007 | Kung | |
| 7,320,148 B1 | 1/2008 | Willette | |
| 7,353,777 B2 | 4/2008 | Morosin | |
| 2003/0163884 A1 * | 9/2003 | Weihrauch | 15/207.2 |

* cited by examiner

GROOMING DEVICE

CLAIM OF PRIORITY

The present invention claims the priority of the Chinese patent application 200830138260.0, filed on Nov. 18, 2008; the Chinese patent application 200830268971.X, filed on Nov. 25, 2008; the Chinese patent application 200920007306.4, filed on Feb. 9, 2009; and the U.S. Provisional Patent Application 61/277,946, filed on Oct. 1, 2009. The contents of the aforementioned applications are fully incorporated herein by reference.

FIELD OF THE INVENTION

The invention relates to animal grooming devices.

BACKGROUND OF THE INVENTION

The present invention relates to a method of grooming an animal. In particular, several embodiments of a pet brush and pet washers are disclosed. The present invention is aimed at providing a versatile and low maintenance device for grooming animals. The present invention has a self cleaning feature and a feature for cleaning furry animals under human care.

Along with the improvement of people's living standard, raising pets is not surprising any more. Many pet raisers are willing to spend a little bit more time to wash their pets and comb the hair. In the combing process, the comb (brush) will be unavoidably enwound by part of the hair. So it takes a longer time for the pet raisers to tidy up the comb (brush).

In connection with the insufficiency in the above prior art, the present invention provides a comb for pets which is of simple structure and convenient use, and can conveniently remove the enwound hair.

In order to realize the above technical purpose, the utility model has adopted the technical solution as follows: a comb for pets includes a comb frame, one side of which comb teeth are arranged in an array; and the difference lies in that it also includes a push plate which can move back and forth along the direction of comb teeth, and the holes or slots that can allow the comb teeth to pass are arranged on the push plate. The said comb teeth can be made from either steel wire, or rubber or rigid plastics.

In order to further realize the above technical purpose, a reset connection device is arranged between the push plate and the comb frame. Under the normal conditions, the push plate abuts against the bottom position of the comb teeth. When the push plate is stressed, it will move forward to the tip of the comb teeth along the direction of comb teeth. When the external force is released the push plate moves backward to reset to the bottom position of the comb teeth under the action of the reset connection device.

As an improvement of the above technical solution, the comb frame is provided with a handle, for the convenient use of the whole comb. Meanwhile, the stressed member of the push plate is also arranged at the handle.

As a further improvement of the above technical solution, the stressed member of the push plate is designed in the form of keystroke, and the handle is in hollow design and its back is provided with opening to accommodate the stressed keystroke of the push plate. The handle appearance is designed into a cambered shape (bent design) in the principle of ergonomics.

As a further improvement of the above technical solution, the reset connection device between the push plate and the comb frame adopts the spring type, and is arranged in the hollow space of the handle.

As a further improvement of the above technical solution, a push plate stopping device is additionally arranged in the bent handle. It can make the push plate stop in a positioned way, so as to achieve the purpose of adjusting the exposed length of the comb teeth and increase the general applicability of the comb for pets.

As a further improvement of the above technical solution, a hair grooming device is mounted at one side of the comb frame where the comb teeth are mounted, to facilitate the pet owner to trim the long hair when combing the hair of pet.

As a further improvement of the above technical solution, a hollow space of the handle may contain a conduit for carrying liquids. The liquids may be delivered into the brush head to be dispensed through hollow bristles or openings.

As a further improvement of the above technical solution, storage tanks may be provided, to hold various chemical substances needed for effective pet grooming and pet care. Multiple levers may be provided to enable intermixing of various substances with other liquids and for regulating the flow of liquids into and out of the present invention.

One way to use the present invention is as follows: the user holds the handle to comb the hair of pet. When pressing the keystroke of the push plate with thumb, the push plate moves towards the tip of the comb along the direction of the comb teeth, and at the same time pushes the hair to the tip of the comb to make the hair automatically fall down, so as to realize the purpose of this invention quite well. Many other uses are possible and denote the versatility of the present invention.

The present invention has the following advantages: 1. simple structure; 2. convenient operation and strong practicality.

At least one embodiment of this invention is illustrated in the accompanying drawings and will be described in more detail herein below.

SUMMARY OF THE INVENTION

The invention is an apparatus for grooming an animal having a brush head, the brush head having a plurality of bristles, each bristle having a midpoint and an endpoint, where the bristles are in general perpendicular orientation to the brush head, a cleaning plate, in general parallel orientation to the brush head, the cleaning plate able to move from a contracted to an extended position, the cleaning plate further having material removed to allow the bristles to protrude through the cleaning plate when it is in the retracted position; and a mechanism for extending and contracting the cleaning plate, wherein the cleaning plate has a bottom surface and the bottom surface does not extend past the bristle endpoint when the cleaning plate is in the extended position. In one embodiment, at least some bristles are wire, and in further embodiments the wire bristles have round coated tips. The brush head may further have a water outlet and a hose coupling for intake and dispensing of liquids. Furthermore, the present invention may have means for conducting water through the handle and out the water outlet, which may be a plurality of hollow bristles.

It is a purpose of the present invention to provide a pet grooming device.

It is another purpose of the present invention to provide a self-cleaning pet grooming device that does not get inundated with animal hair.

It is yet another purpose of the present invention to provide a pet grooming device where the self cleaning feature is effectuated with a push of a button or a keystroke.

It is still another purpose of the present invention to provide a device capable of trimming access hairs.

It is still another purpose of the present invention to provide a device where the level of trimming is controlled by user.

Still another purpose of the present invention is to provide a device capable of controlling the extension length of the bristles.

It is yet another purpose of the present invention to provide a device capable of applying liquids to the area being groomed.

It is yet another purpose of the present invention to provide a device that contains conduits for carrying liquids from a source to the target area being groomed.

Still another purpose of the present invention is to provide a device having at least one container for dispensing a particular substance.

Still another purpose of the present invention is to provide a device capable of controlling the concentration of dispensing substance within the water.

DESCRIPTION OF THE PREFERRED EMBODIMENTS

The invention is an apparatus for grooming an animal having a brush head, the brush head having a plurality of bristles, each bristle having a midpoint and an endpoint, where the bristles are in general perpendicular orientation to the brush head, a cleaning plate, in general parallel orientation to the brush head, the cleaning plate able to move from a contracted to an extended position, the cleaning plate further having material removed to allow the bristles to protrude through the cleaning plate when it is in the retracted position; and a mechanism for extending and contracting the cleaning plate, wherein the cleaning plate has a bottom surface and the bottom surface does not extend past the bristle endpoint when the cleaning plate is in the extended position. In one embodiment, at least some bristles are wire, and in further embodiments the wire bristles have round coated tips.

In another embodiment, the invention is an apparatus for grooming an animal comprising a brush head having a plurality of bristles, each bristle having a midpoint and an endpoint, where the bristles are in general perpendicular orientation to the brush head; a cleaning plate, in general parallel orientation to the brush head, the cleaning plate able to move from a contracted to an extended position, the cleaning plate further having material removed to allow the bristles to protrude through the cleaning plate when it is in the retracted position; and mechanism for extending and contracting the cleaning plate, wherein the mechanism for extending and contracting the clean plate uses a lever.

For the understanding of general technicians in this field and the realization of this utility model, the further description will be made to the embodiments of the utility model in combination with the figures.

Figure 1:
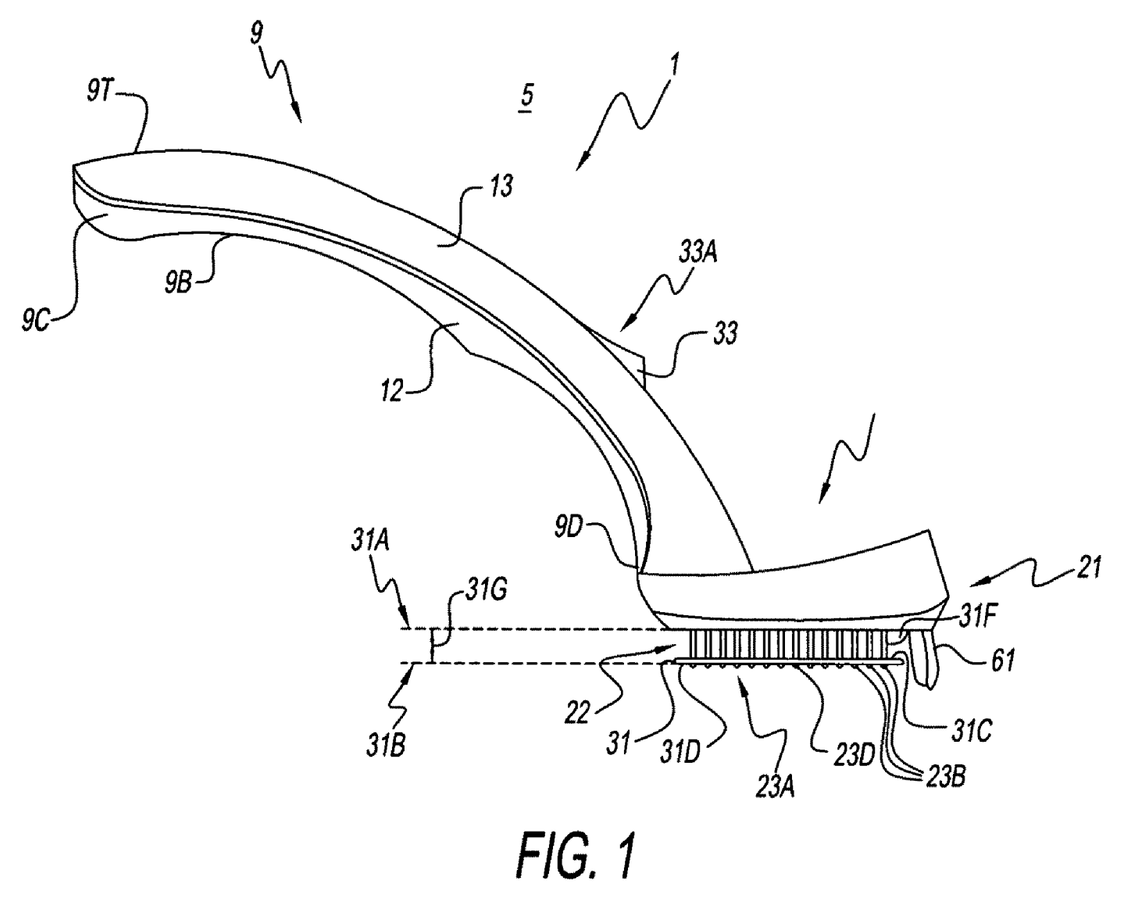
FIG. 1 is a side view of one preferred embodiment of the present invention having a push plate and a keystroke. The push plate is shown in a fully extended position.

Referring now to FIG. 1 shown are a main body 1, apparatus for grooming an animal 5, a brush head 8, a handle 9, a bottom of the handle 9B, a top of the handle 9T, a comb frame 11, a bent handle 12, a handle cover 13, a comb teeth body 21, teeth 22 that may also be referred to as bristles or tapered bristles 22, a tip of the comb 23A, an endpoint 23B, a midpoint 23C, coated tips 23D, a push plate or a cleaning plate 31, a contracted position 31A, an extended position 31B, a bottom surface or a back of the push plate 31C, a top surface 31D, a perpendicular orientation 31F, a general parallel orientation 31G (cleaning plate to brush head), stressed keystroke 33, a mechanism for extending and contracting the cleaning plate 33A, and a hair trimming device or a trimmer 61. The cleaning plate 31 has some of the material removed to allow the bristles 22 to protrude when in retracted position 31B.

Figure 3:
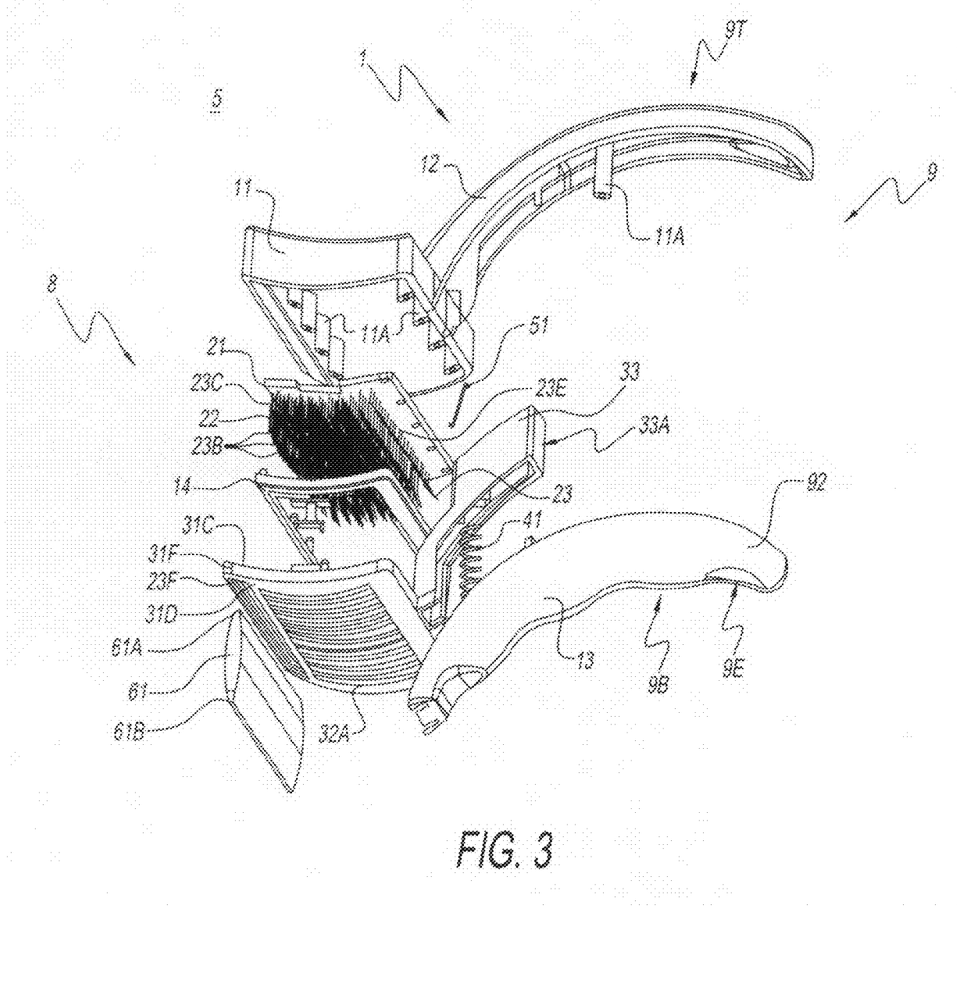

That as shown in FIG. 3 is one typical embodiment of the utility model. It includes a main body 1 that comprises of a comb frame 11 and a bent handle 12. The comb frame is in rectangular shape, and a comb teeth body 21 is arranged, on which three rows of totally 21 plastic tapered teeth 22 are arranged in an array, and the comb teeth body 21 is mounted at one side of the comb frame 11 through a pressing sheet 14. Surely, the comb teeth 22 also can be made from either steel wire or rigid plastics, and the comb teeth 22 also can be directly mounted on the comb frame 11.

Referring back to FIG. 1, the handle 9 may be preferably arched for agronomic considerations. It may also be preferable that the length of the handle 9 between the endpoints 9C and 9D is between 5 inches or 9 inches. The bottom 9B of the handle 9 may be indented to accommodate the outline of a human hand. This may contribute to the ergonomic superiority of the disclosed device, in light of the fact that the typical usage involves lots of repetitive motions that involve pressure exerted by the palm that is holding the presently claimed device. Furthermore, the handle body of the bent handle 12 may additionally contain soft of frictional materials to enhance one's grip on the handle 9. The thickness of the handle 9 may be varied at different points or may be substantially uniform, or be tapered towards either end 9C or 9D. The width of the handle 9 may also be substantially increased to accommodate those with muscular disorders, such as carpal tunnel or arthritis.

Materials for all parts of the present invention, including all described or extrapolated embodiments may be made from the following that include, but are not limited to: metals, plastics, or any composites of such materials. Other useful materials from which to manufacture any of the components of this invention include one or more plastics and resins, including but not limited to plastic, rubber, foam, silicone, ABS, Polycarbonate, Noryl™, PVC, Polystyrene, ABS/PVC, PVC/Acrylic, Polysulfone, Acrylic, Polyethylene, Kydex™, PETG; glass, including but not limited to fiberglass, borosilicate, or quartz; wood; metals, including but not limited to iron, tin, aluminum, copper; rubber including but not limited to natural rubber, SBR, Isoprene rubber, Butadiene rubber, and Chloroprene rubber; or any combinations or composites of these materials or other materials and new materials that may be manufactured in the future. The various parts to the present invention may be manufactured from identical or different materials, combinations of materials, or composites of materials.

The handle 9 may be of a fixed shape, such as, but not limited to a straight shape, or a substantially semicircular or arching shape. The shape of the handle 9 may be made of a material that is capable of being deformed with memory, so that the handle may adjust into any shape that is the most convenient to a user. The material for the handle 9 may also be non-deformable, yet with the shape still adjustable through the use of stress lines or joints (none shown). In FIG. 1, the handle 9 is made out of the handle body 12, which represents a substantially lower section, and a handle cover 13, which represents a substantially upper section. There may be internal braces or armatures, or the handle may be entirely hollow with spaces, toe holds and mounts to accommodate the operation of the stressed keystroke 33. Alternatively, the handle 9 may be pressed, chiseled, shaped or molded out of a single or monolithic part and may be internally hollow or solid.

The handle 9 and the brush head 8 may be manufactured as a single piece or may be joined using fasteners, adhesives, welding, crimping, soldering or clasping. A connection between the brush head 8 and the handle 9 may be temporary or permanent.

In the embodiment shown in FIG. 1, the invention is an apparatus 5 for grooming an animal, comprising, a brush head 8, having a plurality of bristles 22, each bristle having a midpoint 23C and an endpoint 23B, where the bristles 22 are in general perpendicular orientation 31F to the brush head 8; a cleaning plate 31, in general parallel orientation 31G to the brush head 8, the cleaning plate 31 able to move from a contracted 31A to an extended position 31B, the cleaning plate 31 further having material removed to allow the bristles to protrude through the cleaning plate 31 when it is in the retracted position 31A; and a mechanism 33A for extending and contracting the cleaning plate 31, wherein the brush head has a trimmer 61. In other embodiments, the trimmer 61 is removable.

Figure 2:
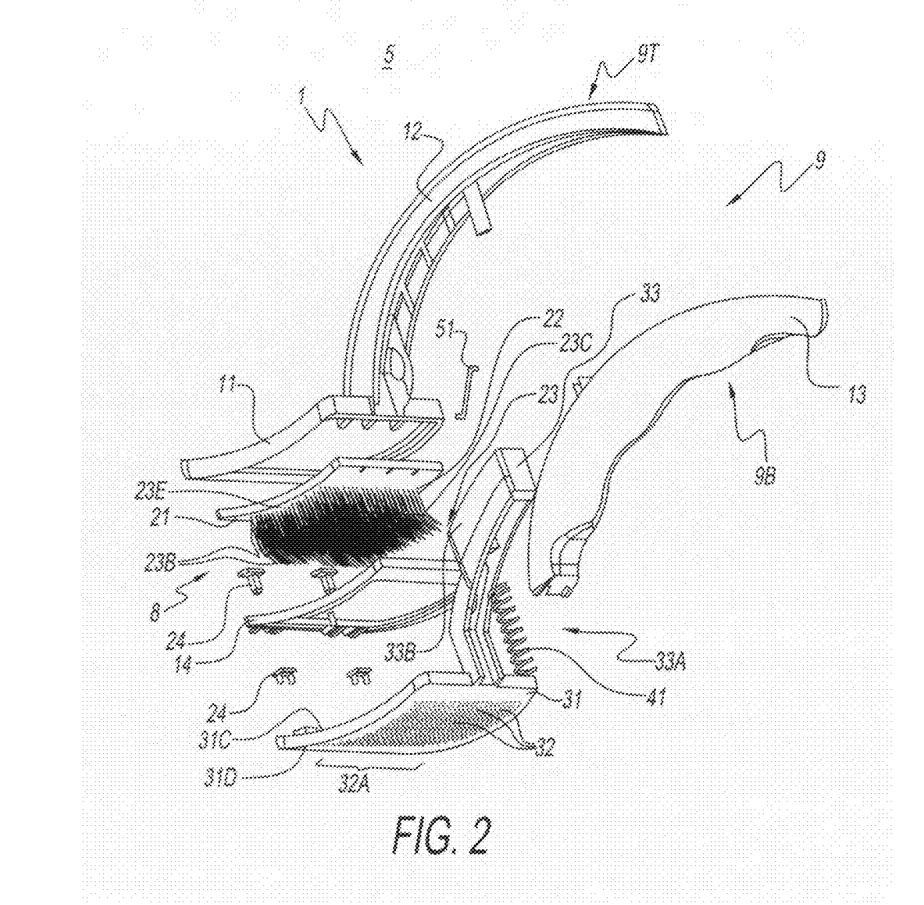
FIGS. 2 and 3 are a exploded views of the embodiment shown in FIG. 1.

FIGS. 2 and 3 represent different angles of an exploded view of the present invention. Shown in these figures are a main body 1, apparatus for grooming an animal 5, a brush head 8, a handle 9, a bottom of the handle 9B, a top of the handle 9T, a comb frame 11, fastener mounts 11A, a bent handle 12, a handle cover 13, a comb teeth body 21, teeth or bristles or tapered bristles 22, a pressing sheet 14, a limit pin 24, a plastic protective cap 23, an endpoint 23B, a midpoint 23C, base 23E, the long slot 23F, a push plate or a cleaning plate 31, a bottom surface or a back of the push plate 31C, a top surface 31D, rows 32A that are also known as slender slots, an array 32A, stressed keystroke 33, a mechanism for extending and contracting the cleaning plate 33A, control key 33B, a return spring or a reset connection device 41, a half-stopping brake 51, and a hair trimming device or a trimmer 61.

The openings 32 or 32A in the push plate 31 may be of any shape, such as circular, square, triangular, or elongated. The elongation may be along the array of bristles 32A or perpendicular to it, or alternatively be crisscrossing or diagonal. The bristles 22 for any of the embodiments may or may not contain protective caps 23. The bristles 22 may be embodied in any shape, such as but not limited to, straight or arching, either at midpoint 23C or towards the endpoint 23B, or the bristles 22 may be conical with the with wider part being at the endpoint 23B or at the base 23E.

In FIGS. 2 and 3, the handle cover 13 is disposed at the bottom of the cover and contains an opening 9E at the point 9C. The trimmer 61 fits within the long slot 23F and may more together with the cleaning plate 31 or remain stationary within the teach body 21. The trimmer 61 preferably contains two trimming edges 61A and 61B to better control the extent of the trim. To change or switch the edges the trimmer 61 may be removed from the long slot 23F and turned over. The extension of the trimmer 61 may alternatively be controlled separately and contain additional settings not shown. Note that in FIGS. 2 and 3 that it is highly preferable that the bottom 31C of the cleaning plate 31 not travel beyond the tips of the bristles 21 when in the extended position. There are several reasons why this is desirable. One reason is that when the cleaning plate 31 moves toward a contracted position 31A, one or more of the bristles 22 may not be able to reenter its opening within the cleaning plate 31, but instead will get snagged against the back of the push plate 31C, which would likely result in the bristle 22 being damaged or deformed. Another reason is that hair that is wound around the bristles 22 may get pulled along by these bristles 22 through the openings 32, into the area between the bottom space of the push plate and the teeth body 21. There may be other reasons why the cleaning plate 31 should preferably not slide past the tips of the bristles 31. The plastic protective cap 23 may be optional. The plastic protective cap fits unto an endpoint 23B of the teeth 22 and may not be required if the teach or bristles are made of soft, non-abrasive material that will not scratch or scuff an animal during grooming.

Figure 4:
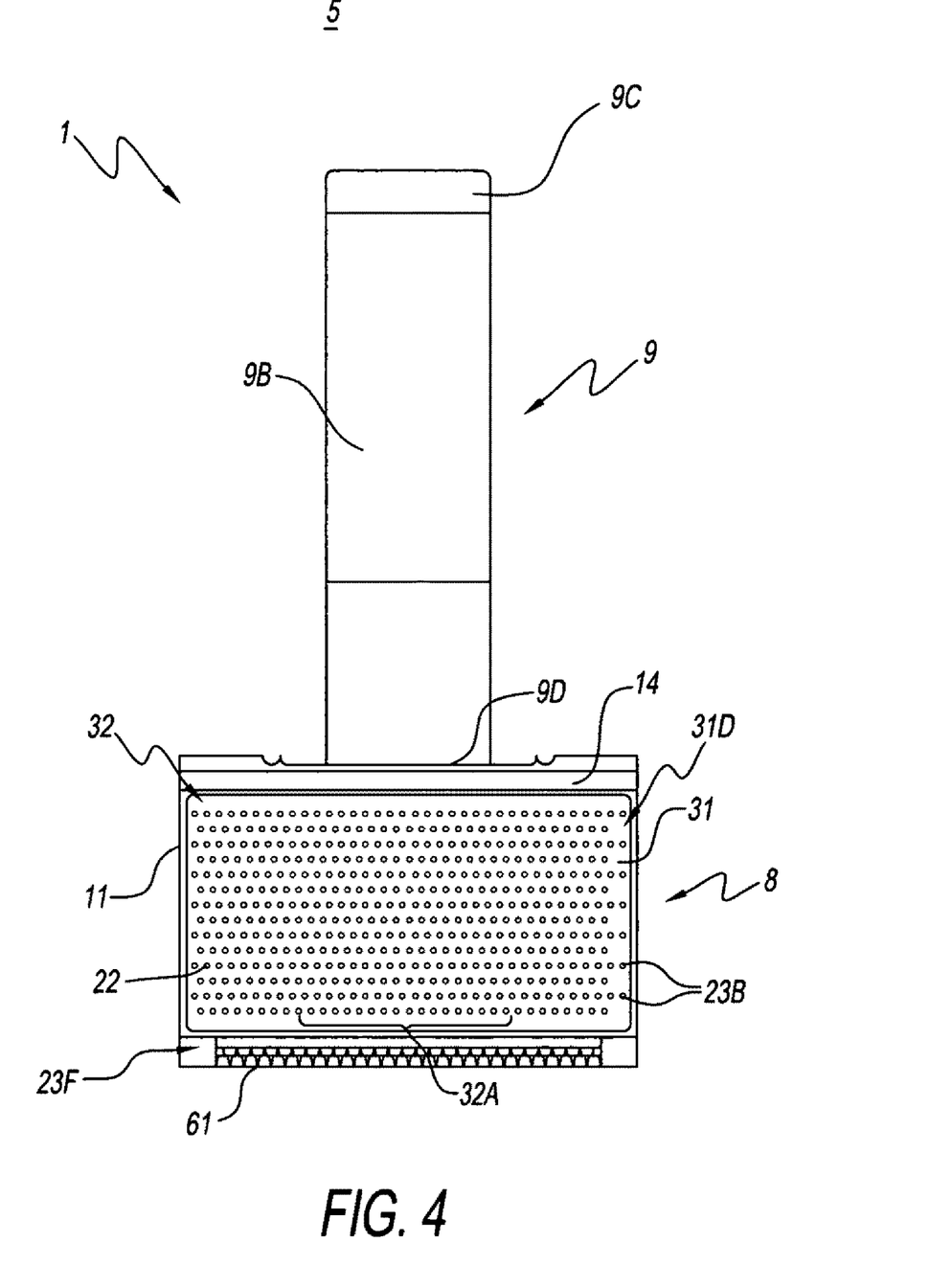
FIG. 4 is a bottom view of one preferred embodiment of the present invention, showing bristles and a trimmer.

FIG. 4 focuses on the bottom side of one of the preferred embodiments of the present invention. Shown are a main body 1, an apparatus for grooming an animal 5, a brush head 8, a handle 9, a bottom of the handle 9B, a comb frame 11, bristles 22, a pressing sheet 14, an endpoint 23B, a long slot 23F is opened transversally on the push plate, a push plate or a cleaning plate 31, a top surface 31D, openings 32, an array 32A, and a hair trimming device or a trimmer 61.

Another major component of the present invention that is clearly illustrated in FIGS. 2 and 3 is the rectangular push plate 31 which is corresponding to the tapered comb teeth 22. Three rows of totally 21 circular holes 32 are arranged on it in an array, and one rectangular stressed keystroke 33 is arranged at the back of the push plate.

Corresponding to this rectangular stressed keystroke 33, one rectangular opening is arranged at the back of the bent handle body 12.

A return spring 41 is mounted in a rectangular hollow space inside the keystroke 33. Another end of the return spring 41 is placed against the handle cover 13.

The handle cover 13 is fastened together with the bent handle body 12.

FIGS. 2 and 3 are the additional embodiments of the utility model. Their major structure is roughly identical with the embodiment shown in FIG. 1, but some differences also exist.

In the embodiment shown in FIG. 2, the comb teeth 22 are made from steel wire, and a plastic protective cap 23 is mounted at the tip of the comb, so as to prevent the sharp steel wire from scuffing the pet. So it looks more human-oriented.

Corresponding to the comb teeth made from steel wire, multiple rows of slender slots 32 are longitudinally opened on the push plate 31.

A half-stopping brake 51 is additionally arranged in the bent handle, and it can make the push plate stop in a positioned way when the push plate moves forward, so as to achieve the purpose of adjusting the exposed length of the comb teeth, and increase the general applicability of the comb for pets.

Meanwhile, a limit pin 24 is additionally arranged between the push plate and the comb frame, in order to prevent the top end from going beyond the tip of the comb failing to reset normally for such reasons as elastic deformation or inertia when the push plate from being pushed to the tip of the comb.

In the embodiment shown in FIG. 3, on the basis of embodiment in FIG. 2, a hair trimming device 61 is mounted on the comb frame 11, so as to facilitate the pet owner trimming the long hair when combing the hair of pet. Corresponding to the hair trimming device 61, a long slot 33 is opened transversally on the push plate, and also a socket for hair trimming device is opened on the comb frame 11. Accordingly, the limit pin 24 is respectively arranged at both sides of the push plate 31 and the comb frame 11.

Figure 5:
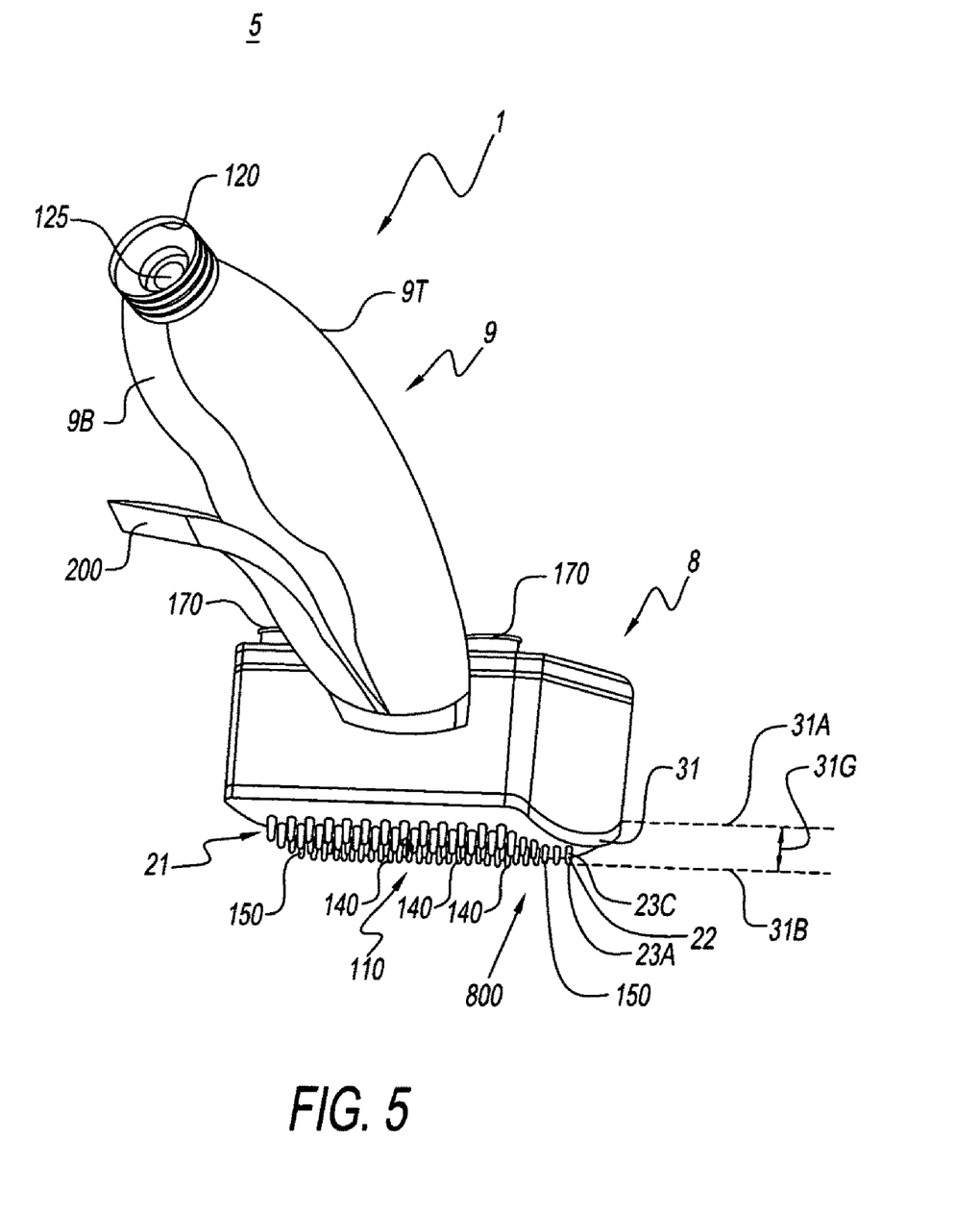
FIG. 5 is a perspective view of the side and back of the present invention, showing a hose coupling, a handle with means for conducting water through the handle and a lever for controlling the flow of liquids.

FIG. 5 is another preferred embodiment of the present invention. In this embodiment the main body 1, in particular the handle 9 is capable of carrying liquids from a source and dispensing them at the grooming area. Also shown are an apparatus for grooming an animal 5, a water outlet 110, a hose coupling 120, an opening for water 125, hollow bristles 140, solid bristles 150, and tank covers 170. Other illustrated items are a brush head 8, a handle 9, a bottom of the handle 9B, a top of the handle 9T, a comb teeth body 21, teeth or bristles or tapered bristles 22, a tip of the comb 23A, a midpoint 23C, a push plate or a cleaning plate 31, a contracted position 31A, an extended position 31B, a general parallel orientation 31G, a and water lever 200

In this embodiment, the invention is an apparatus 5 for grooming an animal, comprising, a brush head 8, having a plurality of bristles 22, each bristle 22 having a endpoint 23B, where the bristles 22 are in general perpendicular orientation to the brush head 8, the brush head 8 further having a water outlet 110; a cleaning plate 31, in general parallel orientation 31G to the brush head 8, the cleaning plate 31 able to move from a contracted 31A to an extended position 31B, the cleaning plate 31 further having material removed to allow the bristles to protrude through the cleaning plate 31 when it is in the retracted position 31A; a mechanism for extending and contracting the cleaning plate 33A; a handle 9, the handle having a hose coupling 120 and means for conducting water through the handle and out the water outlet. In another embodiment, the water outlet comprises a plurality of hollow bristles. In another embodiment, the apparatus has at least one tank for holding a liquid, where the liquid can be dispensed independently or mixed with the water. In another embodiment, the apparatus can be a vacuum, wet or dry, or can be connected to a vacuum. In another embodiment, the apparatus can be a dryer or can be connected to a dryer. In a further embodiment, the apparatus can be motorized, with said motor acting as both a pump, to dispense a liquid/treatment/medicine from a tank, and to generate vibration for a massage function.

One of the main functions of this product is it's ability to dispense, vacuum or interact with the animals skin, penetrating its hair/coat. It cleans from the "inside out". In the case of the vacuuming function it will also remove moisture/water from the inside out.

Still referring to FIG. 5, the hose coupling 120 provides an outside source for water. The hose coupling 120 is shown as a threaded male or a female connector. However, any type of temporary, removable, but hermetic connections may be implemented. Other possible hose couplings 120 may be a quick or snap on connector, a cam and lock connector, a male/female connector as shown, or any other connector that is adapted for, or is commonly used for this purpose. The inside of the connector may contain additional water sealing components, such as, but not limited to, washers and insulating coatings containing rubber, silicone, or a polymeric material. Instead of a water house a vacuum hose may be attached to the coupling 120 and used to remove moisture or any other liquids present within animal's hide. The bristles 22 may be used for water dispensation and for vacuuming, and are able to penetrate deep beneath the layers of animal hair coat, to treat areas normally beyond the reach of present day grooming devices.

The water that enters the handle 9 through the opening 125 may be used for rinsing a grooming surface 800 or may circulate through a mixture of shampoo or conditioner, or any other substance, such as medicine or insecticide. Preferably, the lever 200 regulates the velocity of the water exiting through the water outlet 110. The lever 200 would preferably also able to cut off the flow of water (or air) completely, so that the present invention may function as a faucet. The lever 200 is preferably in the form of a rocking handle that is easily maneuvered with the natural squeeze and relax motions of a human hand. Alternatively, other types of levers 200 may be utilized, for example, a spinning knob, a valve lever, or an electrically enabled bottom. In some embodiments, the lever 200 may be programmed to choke or release a flow of water, so as to accomplish a particular grooming regiment.

The water entering through the opening 125 may travel through a conduit, which may be a separate tube within the handle 9 or a hollow space of the handle 9. In an embodiment shown in FIG. 5, the water may flow freely until a valve regulated by the lever 200 is reached. Such valve may be located along the handle 9, at the connection end 9D, between the handle 9, the brush head 8, or within the brush head 8. Once the valve is opened, the water eventually flows out the water outlet 110. One skilled in the art would appreciate that any reference to water or water flow may be replaced with a flow of any liquid of low viscosity, a flow of dissolved medicines or air. The lever 200 may be coated with slip resistant coating, or may be made out of resin, polymer or rubber to achieve a greater degree of friction between a users hand the surface of the lever 200.

The water outlet 110 may be embodied in at least one opening within the teeth body 21, with a corresponding openings within the push plate or cleaning plate 31, if such is present. These openings (not shown) would preferably be situated between or among the bristles 22. However, in the preferred embodiment a water outlet is formed by removing the inside material within some or all of the bristles 22, along with the endpoint 23B. The water will then egress from endpoints 23B of the hollow bristles 140 toward the treatment area 800. The hollow bristles 140 or openings for water or vacuum may be concentrated in one area of the brush head 8, or may be spread throughout the brush head 8. The degree of concentration of hollow bristles 140 would likely be directly proportional to the rate of water velocity circulating through the apparatus 5 and exiting towards the treatment area 800. On the contrary, a greater degree of dispersion or dilution of the hollow bristles 140 versus solid bristles 150, would likely result in a more gentle flow of liquid, spread across a greater coverage area for any single brush stroke. The brush head 8 may contain all solid bristles 150 or all hollow bristles 140 or a mixture of the two bristle types. Furthermore, one skilled in the art may appreciate that hollow bristles 140 may be sealed temporarily with a mechanism, or partially obstructed, or influenced in any other way that would produce a desirable water velocity and coverage area. The present invention may function as a massager by altering the velocity and distribution of the water flow at a particular rate.

The cleaning plate 31 is shown in a substantially contracted position 31A. When extended, the cleaning plate 31 moves toward the extracted position 23A. The handle 9 may contain a stressed keystroke 33 for controlling the cleaning plate 31. Alternatively, the mechanism for contracting and extending the cleaning plate 33A may be disposed on the brush head 8 or on the side of the handle 9, or may be added to the functionality of the lever 200. As shown, the cleaning plate 31 is at a substantially parallel orientation 31G with respect to the axis of the brush head 8.

Figure 6:
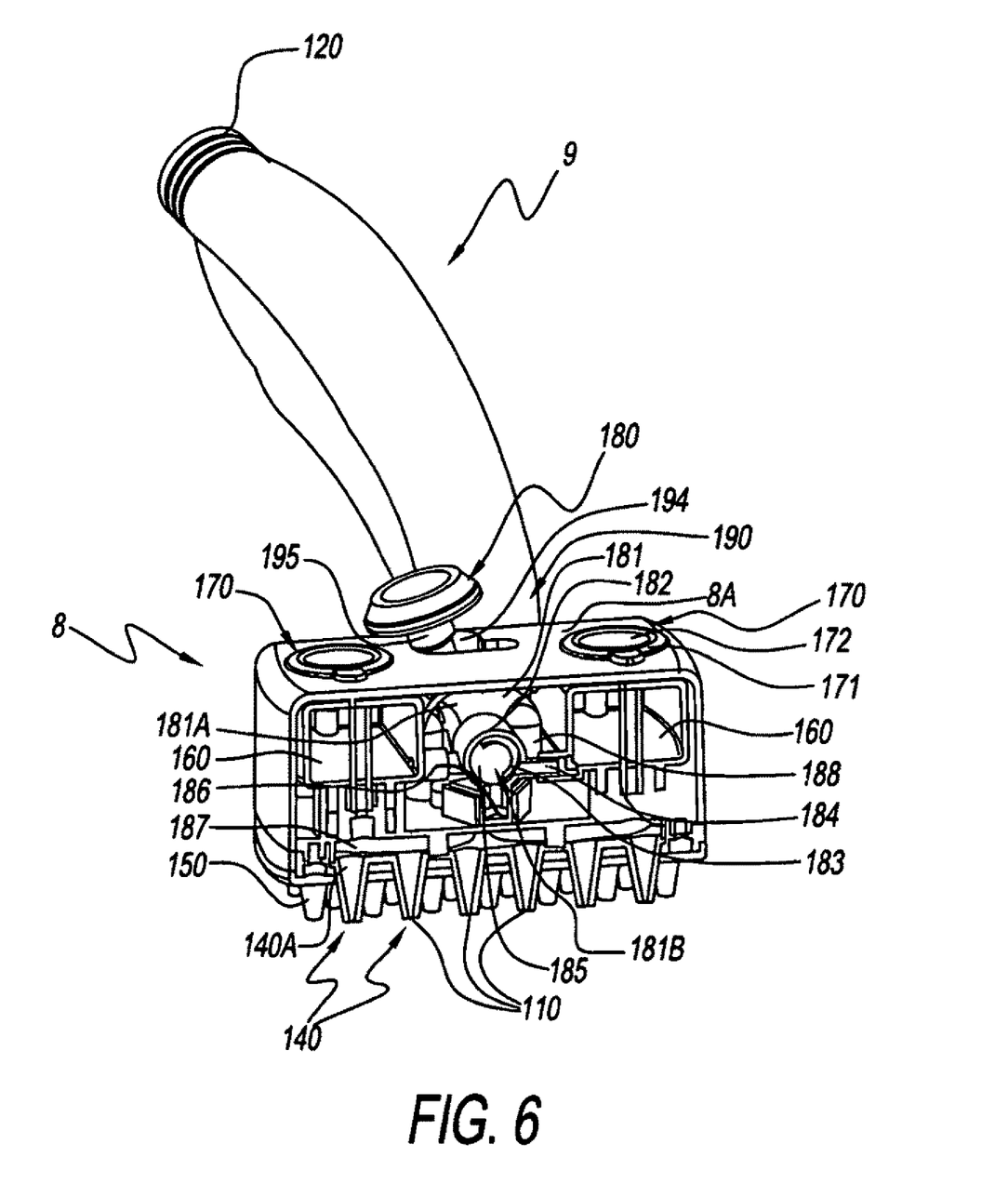
FIG. 6 is a cross sectional view of the brush head of the embodiment shown in FIG. 5.

Referring now to FIG. 6, shown is a cross sectional view of one of the preferred embodiments of the present invention. Illustrated are an apparatus 5, a water outlet 110, a hose coupling 120, hollow bristles 140, solid bristles 150, a tank 160, a tank cover 170, dispensing lever 180, and a dispensing lever slot 190. One skilled in the art would appreciate that multiple configurations are possible to enable inlet and egress of water, or for intermixing of the water with other grooming substances. The water may be expelled toward the grooming area by itself or in a mixture.

In the present invention, the dispensing lever 180 controls the pinion cam 181, which rotates within a pinion chamber 182. This rotation causes a valve cam 183 to alternatively open or seal the supply channels 184. The supply channels 184 are connected to the tanks 160, and when opened, they feed the contents of the tanks 160 into the mixing chamber 187. From the mixing chamber 187, the mixture travels into the hollow areas 140A of the hollow bristles 140, and outwards toward the grooming area 800.

The dispensing lever 180 moves laterally along the lever slot 190. The lever slot 190 may have position indicators for selecting a neutral concentration 194 for plain water spray. A different a setting may be used for selecting an activated concentration 192 in which an amount of a grooming substance is mixed together with water. The lever may be used to stop the flow or liquids or to permit a very low or very high degree of water flow. A setting may also be provided to activated a water or vibration massager that may be incorporated within the apparatus 5.

Any grooming substance may be used, for example, one tank 160 may contain shampoo, while the other tank 160 may contain a conditioner. Alternatively, the present invention may be suitable for medical treatment or insect removal or prophylactic treatments, where the tanks 160 may be filled with medicinal liquids, gels, or insecticides and other poisonous substances. The tanks 160 are preferably filled through the openings that are sealed with tank covers 170. The tank covers 170 may be frictionally held in place or may be fastened into place with mating threads or with a snap joint. A lift tab 171 may be included for convenient grab location. Alternatively the tank cover 170 may be raised, so that it protrudes above the brush head top 8A. Alternative grab devices may be used in conjunction with a raised tank cover 170, such as, frictional elements, grooves, or finger indentations. The top of the tank cover 172 may contain designations, such as, but not limited to "shampoo", "conditioner"; or caution alerts: "poison" or "contents under pressure".

Still referring to FIG. 6, the dispensing lever 180 is tilted within the lever slot 190 into an activated position. For a more intuitive use, the tank 160, toward which the dispensing lever 180 is tilted, may preferably be the one that is being presently activated or drained. The shaft 194 of the lever 180 is connected directly to the pinion cam 181. The pinion cam 181 contains a flange section 181A and an axle section 181B that is submerged within a pinion chamber 182, and forms a valve cam 183. Alternatively, the valve cam 183 and the pinion cam 181 may be separate and move in direct or indirect cooperation with each other. The valve cam 183 contains a semicircular groove 185 that engages the open ends of the channels 184. When the open ends are engaged, the other end of the groove also engages a drainage channel 186, thus creating a temporary linking channel between one of the supply channels 184 and the drainage channel 186.

The semicircular groove 185 need not actually be semicircular and the valve cam 183 may instead be embodied in a combination of tubes and covers that engage or seal up the above mentioned channels. In the present embodiment, the semicircular groove 185 is preferably long enough to engage the supply channels 184 of both tanks 160, either simultaneously or separately. When engaged simultaneously, the substances stored within both tanks 160 would both drain into the mixing chamber 187 through the drainage channel 186, and then through the hollow bristles 140 toward the grooming area 800.

Still referring to the embodiment shown in FIG. 6, the water is being channeled through the handle 9, and into the water channels 188. In the embodiment shown, the water does not enter into the tanks 160, but mixes with any substance that is used in the mixing chamber 187. Such configuration permits the substance stored in the tanks 160 to be drained onto the grooming area 800 without the presence of the water. Alternatively, the water may be forced into a tank 160 and mix therein with a stored substance, prior to entering the mixing chamber 187. Such embodiment may be preferred since it may lead to a more homogeneous mixture of water and grooming substance, and may avoid residue buildup within the tanks 160.

The tanks 160 are shown to be gravity tanks, meaning that the substances stored within the tanks 160 are drained by the force of gravity. Alternatively, the drainage may be assisted with a spring or piston mechanism, or may be facilitated by a vacuum device, such as a pump, or the configuration may be such that air trapped within the brush head 8 escapes naturally, and is not replaced, creating a vacuum effect with a bias toward the endpoints 23B.

The shaft 195 is preferably encased within or connected to a torsion, extension or compression spring or springs (not shown), that are create a bias location for the shaft 194. The bias may be towards a neutral setting 190 or towards the activated setting 192. Such a spring or another fixating mechanism common in the art, may be utilize to retain the shaft 195 within a neutral or activated position 194 or 192.

The embodiment of the present invention shown in FIG. 6, may additionally contain a dryer comprised of a heating element and or a fan. A separate drier may be attached to the present invention, so as to utilize the bristles 22 for a greater heat penetration. In another alternative, the brush head 8, or the bristles 22 may be able to vibrate. The brush head 8 or a separate attachment to the present invention may serve as a vacuum to absorb any access moisture. A vacuum may be highly desirable to remove any soap residue, or medicinal residue that may be toxic to humans or other animals. A vacuum or a drier may also be desired so that the groomed appearance of the animal is achieved more rapidly, without the need to wait out the drying time.

Figure 7:
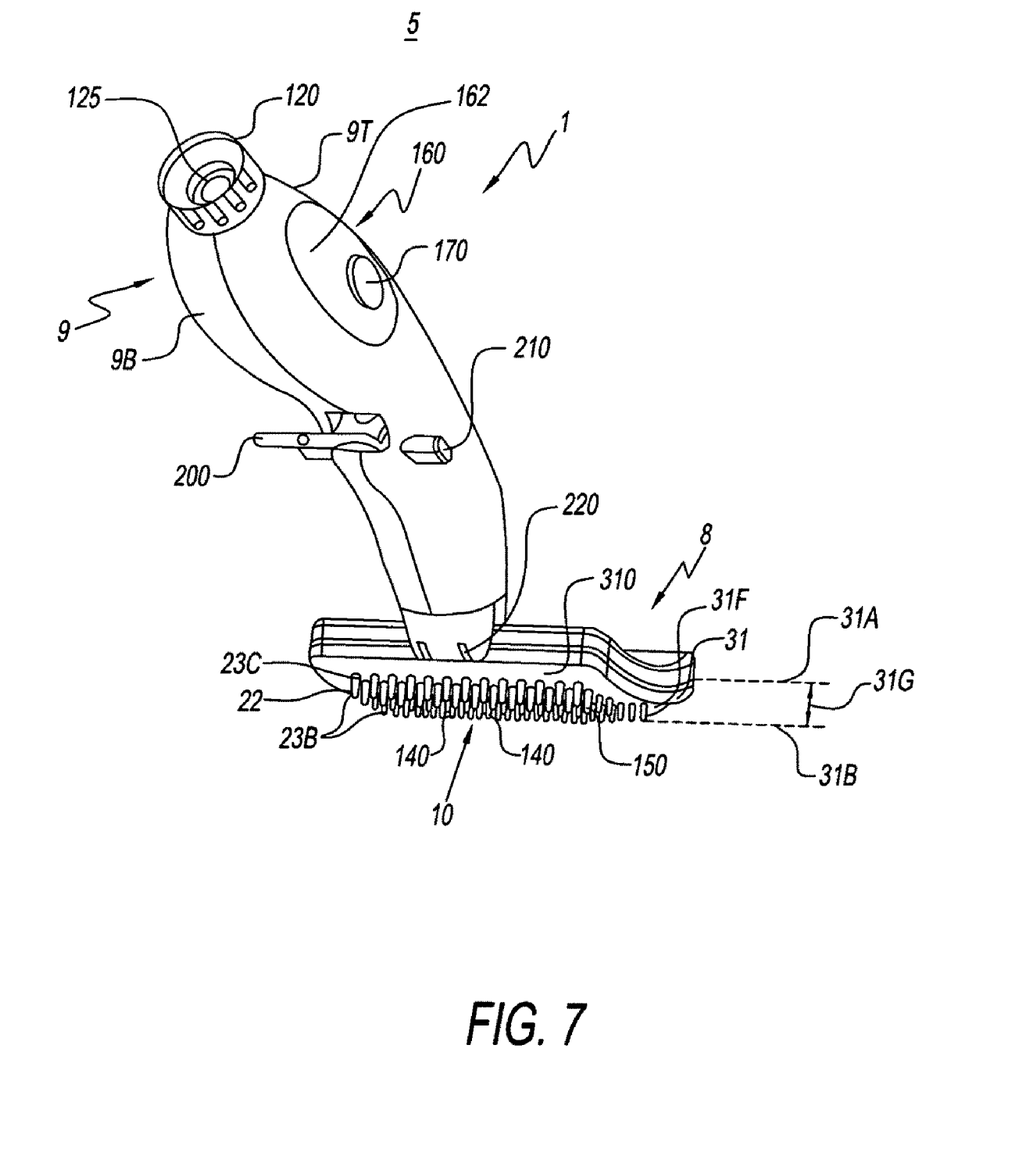
FIG. 7 is a perspective view of a side and back of another embodiment of the present invention, showing a hose coupling, a handle with means for conducting water through the handle, and a lever for controlling the flow of liquids.

Referring now to FIG. 7, shown are a main body 1, apparatus for grooming an animal 5, a brush head 8, a handle 9, a bottom of the handle 9B, a top of the handle 9T, teeth or bristles or tapered bristles 22, an endpoint 23B, a midpoint 23C, a push plate or a cleaning plate 31, a contracted position 31A, an extended position 31B, a top surface 31D, a perpendicular orientation 31F, a general parallel orientation 31G of the cleaning plate 31 to brush head 8, a water outlet 110, or rather a water outlet area 110, a hose coupling 120, a water opening 125, hollow bristles 140, solid bristles 150, a tank 160, a tank cover 170, a lever 200, a water level control 210, and hinges 220.

The embodiment shown in FIG. 7 is similar the embodiment shown in FIGS. 5 and 6, with the addition to a more agronomic handle 9, an alternative position for the tanks 160, additional controls for water 200 and 210, and an adjustable brush head 8. Note that the embodiment of the present invention that is capable of channeling water would preferably also contain all the improvements and functionalities included in a non-water enabled embodiment discussed in FIGS. 1-4. For example the cleaning plate 31 may have a half-stopping brake 51 that permits it to shorten the exposed length of the bristles 22 so that the bottom surface 31C of the cleaning plate 31 can be adjustably fixed at the midpoint 23C.

The tank 160 may contain a grooming substance that may be introduced through an opening that is sealed with a cover 170. The surface of the tank 160 or the cover 170 may be made of clear or translucent material, so that a user may be able to detect when a grooming substance is running low. Additionally, measurement markers may be etched or drawn on the side 162 of the tank 160. Although only one tank 160 is shown, a separate tank or a second compartment of the tank may be visible on the other side of the handle 9. The covers 170 may be detachable and may be frictionally held in place when reinserted. Alternatively, the covers 170 may contain a toggle mechanism, where pulling or depressing the button 170 would unseal the tank 160 and a similar maneuver would reseal the tank 160.

The water level control 210 along with the lever 200 may combine to control the water level and its velocity, respectively. For example, the water level control 210 determines the amount of water that may be permitted to flow down to the brush head 8, while the lever 200 may determine the velocity of this amount of water.

The hinges 220 may permit one to change the angle of the brush head 8 with respect to the handle 9. The handle 9 may have frictional accents on the handle or may be made out of frictional material or contain a frictional surface or a rubber sleeve.

The push plate 31 is shown in a contracted position 31A, and substantially parallel 31G to the axis of the brush head 8. The bristles 22 are shown to be at a substantially perpendicular orientation 31F to the cleaning plate 31 or comb frame beneath it (not visible).

Figure 8:
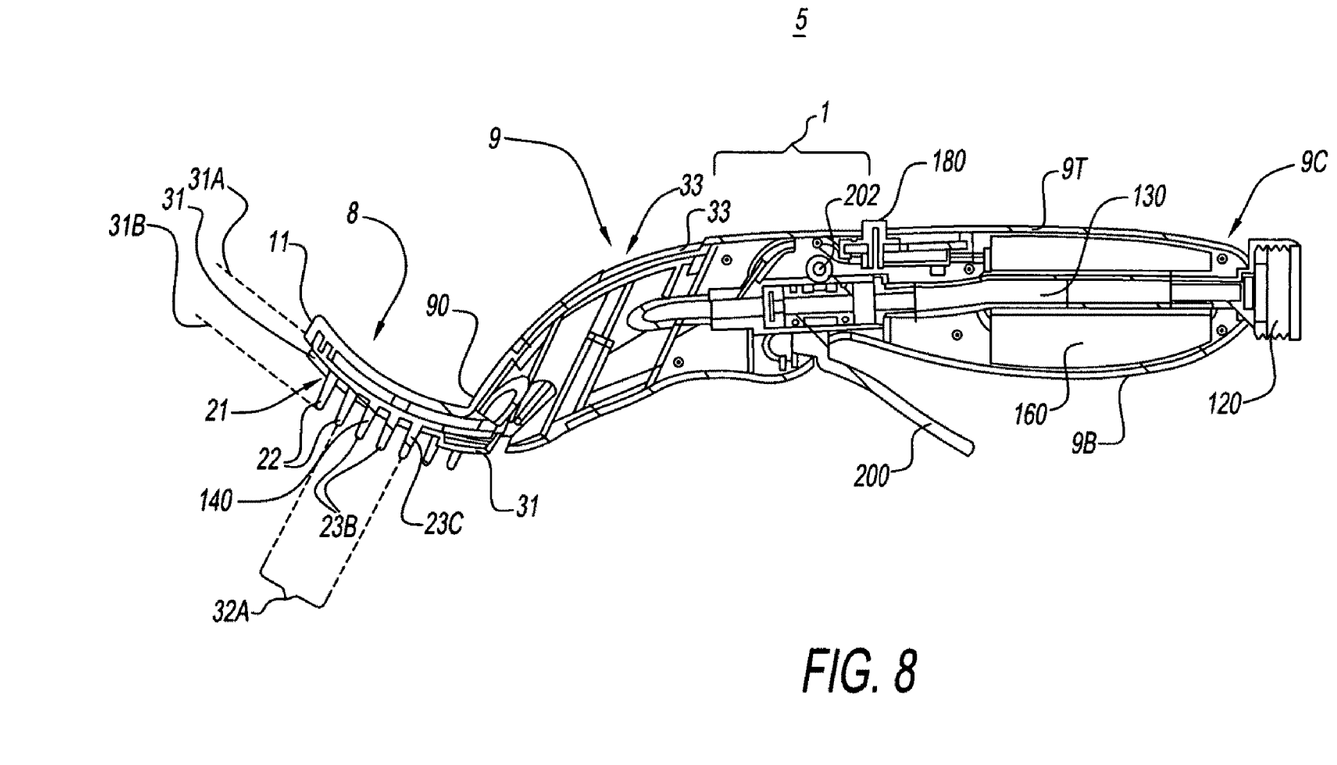
FIG. 8 is a cross sectional side view of the embodiment shown in FIG. 7.

FIG. 8 is a cross sectional view of the preferred embodiment of the present invention that is described in FIG. 7. Shown in this figure is are a main body 1, apparatus for grooming an animal 5, a brush head 8, a handle 9, a bottom of the handle 9B, a top of the handle 9T, a comb frame 11, a comb teeth body 21, teeth or bristles or tapered bristles 22, an endpoint 23B, a midpoint 23C, a push plate or a cleaning plate 31, a contracted position 31A, an extended position 31B, an array 32A, a mechanism for extending and contracting the cleaning plate 33A, stressed keystroke 33, a hose coupling 120, means for conducting water through the handle 130, hollow bristles 140, a tank 160, a dispensing lever 180, and a lever 200.

The embodiment shown FIG. 8 is alternative to the one shown in FIG. 5, since most of the components are reused but may disposed in alternative locations. The embodiment shown in FIG. 5 has most of the controls within or around the brush head 8, whereas the embodiment shown in FIGS. 7 and 8 contains most of the controls within or in close proximity to the handle 9. The overall length 300 of the handle 9 is preferably between 5 and 14 inches, with the preferred length of the brush head 310 between 2 to 6 inches, and with the preferred width of the brush head (not illustrated) between 2 to 6 inches. The preferred diameter of the handle 9 should preferably not exceed two inches.

The means for conducting water through the handle 130 is preferably a tube that originates at the hose coupling 120. The water flows until the choke valve 208 that is controlled by the lever 200, and a water lever (not illustrated). The water lever 210 would preferably be placed just ahead of the lever 200, but is not visible in this diagram. Alternatively, the water level control can be incorporated into the lever 200 or may be mounted at a different location, and with a separate valve (not shown). The lever 200 preferably contains a spring within a hinge 202 that may be biased at maintaining the lever 200 at a fully open position, which is the total choke position. This will permit one to connect a hose and turn on the water, without fearing that the water will begin to discharge through the shower head 8. The tank 160 may be internal, or may be external, with feed of a substance being accomplished with a hose that would carry a substance from an external storage tank (not shown) into the apparatus 5.

Also shown, the dispensing lever 180 may shift 189 lengthwise or laterally or in any direction. The dispensing lever 180 opens and closes the supply channel 184 that leads from the tank 160 toward the drainage channel 186. The drainage channel 186 connects to the means for conducting water through the handle 130.

The cleaning plate 31 is capable of being extended 23A and contracted 31A with the mechanism for extending and contracting the cleaning plate 33A, which may be in the form of the stressed keystroke 33.

The above is the preferred implementation method of the utility model. In accordance with the contents disclosed in the utility model, some identical and alternative solutions that come into the mind of the general technicians in this field shall be included into the protection range of the utility model.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. An apparatus for grooming an animal, comprising:
    a brush head, having a first plurality of bristles, each bristle having an endpoint, where the bristles are in general perpendicular orientation to the brush head, the brush head further having a water outlet comprising a second plurality of bristles, said second plurality of bristles being hollow;
    a cleaning plate, in general parallel orientation to the brush head, the cleaning plate able to move from a contracted to an extended position, the cleaning plate further having material removed to allow the bristles to protrude through the cleaning plate when it is in the retracted position;
    a mechanism for extending and contracting the cleaning plate;
    a handle, the handle having a hose coupling; and
    a device for conducting water through the handle and out the water outlet, and wherein a velocity of the water flowing out the water outlet is controlled by a first lever attached to a choke valve and the amount of water flowing out the water outlet is controlled by a second lever attached to said choke valve.

2. The apparatus of claim 1, wherein the apparatus further comprises at least one tank for holding a liquid.

3. The apparatus of claim 1, wherein the water outlet comprises a liquid/medicine dispenser.

* * * * *